US00RE45540E

(19) United States
(12) Reissued Patent
Tewes et al.

(10) Patent Number: US RE45,540 E
(45) Date of Reissued Patent: Jun. 2, 2015

(54) TOOL HOLDER

(75) Inventors: Günter Tewes, Unkel/Rhein (DE); Silvia Tewes, legal representative, Unkel/Rhein (DE); Jochen Blens, Kall (DE); Bernd Holl, Neustadt/Wied (DE)

(73) Assignee: Wirtgen GmbH (DE)

(21) Appl. No.: 13/253,540

(22) Filed: Oct. 5, 2011

Related U.S. Patent Documents

Reissue of:
(64) Patent No.: 7,597,402
Issued: Oct. 6, 2009
Appl. No.: 10/586,428
PCT Filed: Apr. 16, 2005
PCT No.: PCT/EP2005/004057
§ 371 (c)(1),
(2), (4) Date: Jul. 19, 2006
PCT Pub. No.: WO2006/000270
PCT Pub. Date: Jan. 5, 2006

(30) Foreign Application Priority Data

Jun. 24, 2004 (DE) ..... 10 2004 030 691

(51) Int. Cl.
*E21C 35/197* (2006.01)
*E21C 35/18* (2006.01)
*E21C 35/187* (2006.01)

(52) U.S. Cl.
CPC ..... *E21C 35/187* (2013.01); *E21C 35/18* (2013.01)

(58) Field of Classification Search
CPC ..... E21C 35/197; E21C 2035/1826
USPC ..... 299/102, 81.2, 81.1, 81.3
See application file for complete search history.

(56) References Cited

U.S. PATENT DOCUMENTS

| | | | |
|---|---|---|---|
| 4,247,150 | A | 1/1981 | Wrulich et al. |
| 4,337,980 | A | 7/1982 | Krekeler |
| 4,684,176 | A | 8/1987 | Den Besten et al. |
| 4,818,027 | A | 4/1989 | Simon |
| 4,915,455 | A | 4/1990 | O'Neill et al. |
| 5,529,384 | A | 6/1996 | Ojanen et al. |
| 5,683,144 | A | 11/1997 | Kammerer et al. |
| 5,738,415 | A | 4/1998 | Parrott |
| 6,257,672 | B1 | 7/2001 | Parrott |

FOREIGN PATENT DOCUMENTS

| | | | |
|---|---|---|---|
| DE | 8520046 | U1 | 8/1985 |
| DE | 85 20 046.8 | | 10/1985 |
| DE | 3441949 | C1 | 4/1986 |
| DE | 2954400 | C1 | 7/1986 |
| DE | 43 22 401 | C2 | 1/1995 |
| DE | 4322401 | A1 | 1/1995 |

(Continued)

*Primary Examiner* — John Kreck
(74) *Attorney, Agent, or Firm* — Patterson Intellectual Property Law, PC; Lucian Wayne Beavers

(57) ABSTRACT

A tool holder including a tool box with a tool seat in a holding projection for receiving a tool in such a manner that it can be replaced. The tool seat is configured as a bore and has a tool insertion opening. The tool holder has a fastening side with a fastening projection and, facing away from said fastening side, an exterior, and during use of the tool centrifugal forces are effective in the direction from the fastening side to the exterior. This invention ensures the free rotatability of a tool inserted in the tool holder even if overburden material enters the tool seat. For this purpose, the holding projection has an opening penetrating the inner wall of the tool seat and creating a spatial connection to the exterior, and the opening opens the tool seat towards the exterior.

20 Claims, 3 Drawing Sheets

(56) References Cited

FOREIGN PATENT DOCUMENTS

| | | | |
|---|---|---|---|
| EP | 0771911 | A1 | 5/1997 |
| EP | 1000721 | A1 | 5/2000 |
| EP | 1033216 | A1 | 9/2000 |
| EP | 1045075 | A2 | 10/2000 |
| JP | 5020902 | | 3/1975 |
| JP | 62253897 | A | 11/1987 |
| JP | 63126495 | U | 8/1988 |
| JP | 2655267 | B2 | 9/1997 |
| WO | 02090717 | A2 | 11/2002 |

TOOL HOLDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention relates to a tool holder arrangement with a chisel holder, which has a chisel receiver in a holding neck for receiving a chisel, exchangeably received therein, wherein the chisel receiver has a shape of a bore and has a chisel insertion opening, the chisel holder has a fastening side with a fastening neck and, facing away from the fastening side, an exterior, and during tool operation centrifugal forces act in a direction from the fastening side to the exterior.

2. Discussion of Related Art

Known arrangement is taught by German Patent Reference DE 43 22 401 C2. Such tool holder arrangements are used in connection with road milling machines, ground stabilizers, mining machinery or the like, for example.

Customarily, the chisel holder is attached to the surface of a milling roller by a base element. The chisel holder is used for the exchangeable reception of a chisel in the chisel receiver. Here, the chisel is maintained with play in the chisel receiver, mainly by using a clamping sleeve. The chisel is then maintained secure against loss, but freely rotatable around a center axis. During the tool operation, the chisel wears down the surface to be processed, for example a road surface, with a chisel tip. The material of the surface is cut into pieces during the process. Coarse and fine surface particles are created and removed from the area of the milling roller. The fine particles can penetrate into the area of the chisel receiver, and become stuck there and hinder free rotatability of the chisel. Occasionally, they stop the chisel completely. The reduced rotating capability causes a rapid wear of the chisel. If this is not recognized in time, the chisel holder is also damaged. This then requires a cost-intensive exchange step.

It can become further disadvantageous if the fine particle material which penetrated into the chisel receiver hinders the exchange of the chisel in the chisel holder.

SUMMARY OF THE INVENTION

It is one object of this invention to provide a tool holder arrangement of the type mentioned above, but wherein chisel stoppage because of removed material which penetrated the chisel receiver is prevented.

This object is attained with a holding neck having an opening penetrating the interior wall of the chisel receiver and creating a spatial connection with the surroundings. The opening opens the chisel receiver in the direction toward the exterior.

The removed material carried into the area of the chisel receiver is transported by the rotating chisel along a longitudinal axis of the chisel in the direction facing away from the chisel head. A "pump action" is thus created, which is aided by periodic tool engagement. In accordance with this invention, the chisel holder now has an opening in the area of the chisel receiver and is arranged on the side of the centrifugal force. When the removed material is conveyed into the chisel receiver, it reaches the area of the opening and can again escape into the surroundings. The free rotatability of the chisel is thus maintained.

In one embodiment of this invention, the chisel receiver is embodied as a through-bore and has an expulsion opening facing away from the chisel insertion opening. The opening opens the chisel receiver in the area of the expulsion opening and extends, starting at the expulsion opening, in the direction of the chisel insertion opening. An extensive accessibility to the chisel receiver is provided to the user, which permits a rapid and simple chisel removal.

In accordance with one embodiment of this invention, a chisel shaft of a chisel is inserted into the chisel receiver, and the opening is arranged at least in the area of or near the chisel receiver assigned to the shaft end. With this arrangement, use is made because the carried-in removed material is transported in the direction of the chisel axis toward the free end of the chisel shaft. Now, because the opening is arranged in the area of or near the shaft end of the chisel, the material being collected can easily reach the surroundings.

In this case the opening can be arranged up close to the shaft end, at the shaft end, or partially extending over the shaft end.

The opening can be easily made if the opening is designed as a slit-shaped cutout, which has two delimitation faces extending parallel with respect to each other in the direction of the longitudinal axis of the chisel receiver, wherein the delimitation faces are at a distance from each other which is less than or equal to the bore diameter of the chisel receiver, or the delimitation faces extend at an angle in relation to each other and define an angle of less than 180°. If the opening takes up a portion of the interior wall of the chisel receiver extending over less than 180° of a circumference of the bore-shaped chisel receiver, then the support function of the chisel receiver for the inserted chisel shaft is only slightly diminished.

The accessibility of the chisel receiver for a disassembly tool is further improved if the chisel holder is fastened on a base element. The base element has a cutout which provides access for a disassembly tool to the expulsion opening of the chisel receiver. The cutout makes a transition into the opening.

A tool holder arrangement in accordance with this invention can have at least one liquid spray device assigned to the chisel holder, which introduces liquid into the chisel receiver through the opening. Then the liquid dissolves the removed material collecting in the chisel receiver, so that it can be easily removed through the opening.

This takes place particularly effectively if the liquid spray device applies a jet of liquid to the free end of the chisel shaft.

BRIEF DESCRIPTION OF THE DRAWINGS

This invention is explained in greater detail in view of an exemplary embodiment represented in the drawings, wherein.

DETAILED DESCRIPTION OF THE INVENTION

Figure 1:
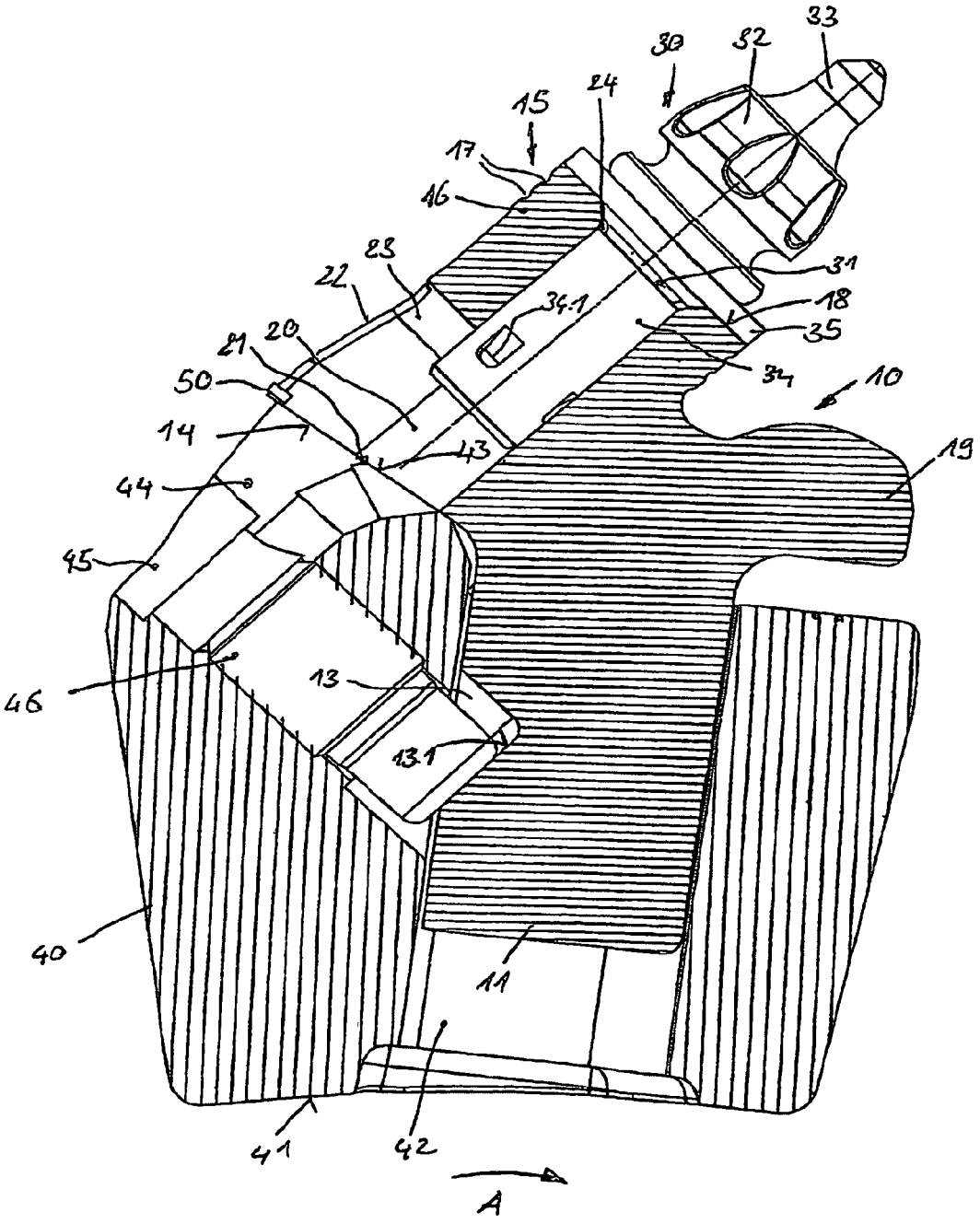
FIG. 1 shows a tool holder arrangement with a chisel, a chisel holder and a base element, in a sectional lateral view.

A tool holder arrangement having a base element 40 is shown in FIG. 1, and can be fastened, for example welded, to the curved surface of a milling roller (not represented) by a fastening surface 41. The base element 40 has a plug-in receiver 42, into which a fastening neck 11 of a chisel holder 10 is inserted. The fastening neck 11 has a depression 13 with a pressure face 13.1. The pressure face 13.1 is acted upon by a pressure screw 46, which is screwed into an interior thread of the base element 40. The pressure screw [48] *46* is accessible for a screwing tool through a tool opening 45.

The pressure screw 46 acts on a pressure face 13.1 in such a way that the fastening neck 11 is drawn into the plug-in receiver 42. In the process, guide faces 12 arranged in a prism-shape on the front are pressed against correspondingly embodied counter-faces of the base element 40.

Figure 2:
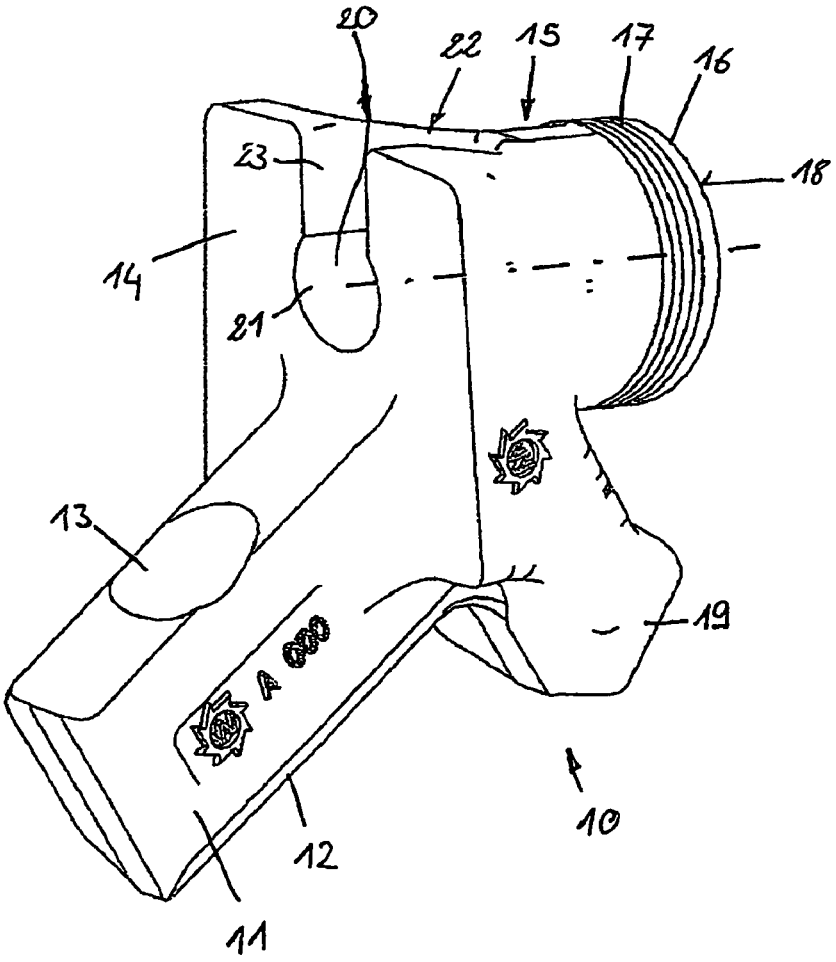
FIG. 2 shows the chisel holder of FIG. 1, in a perspective rear view.
Figure 3:
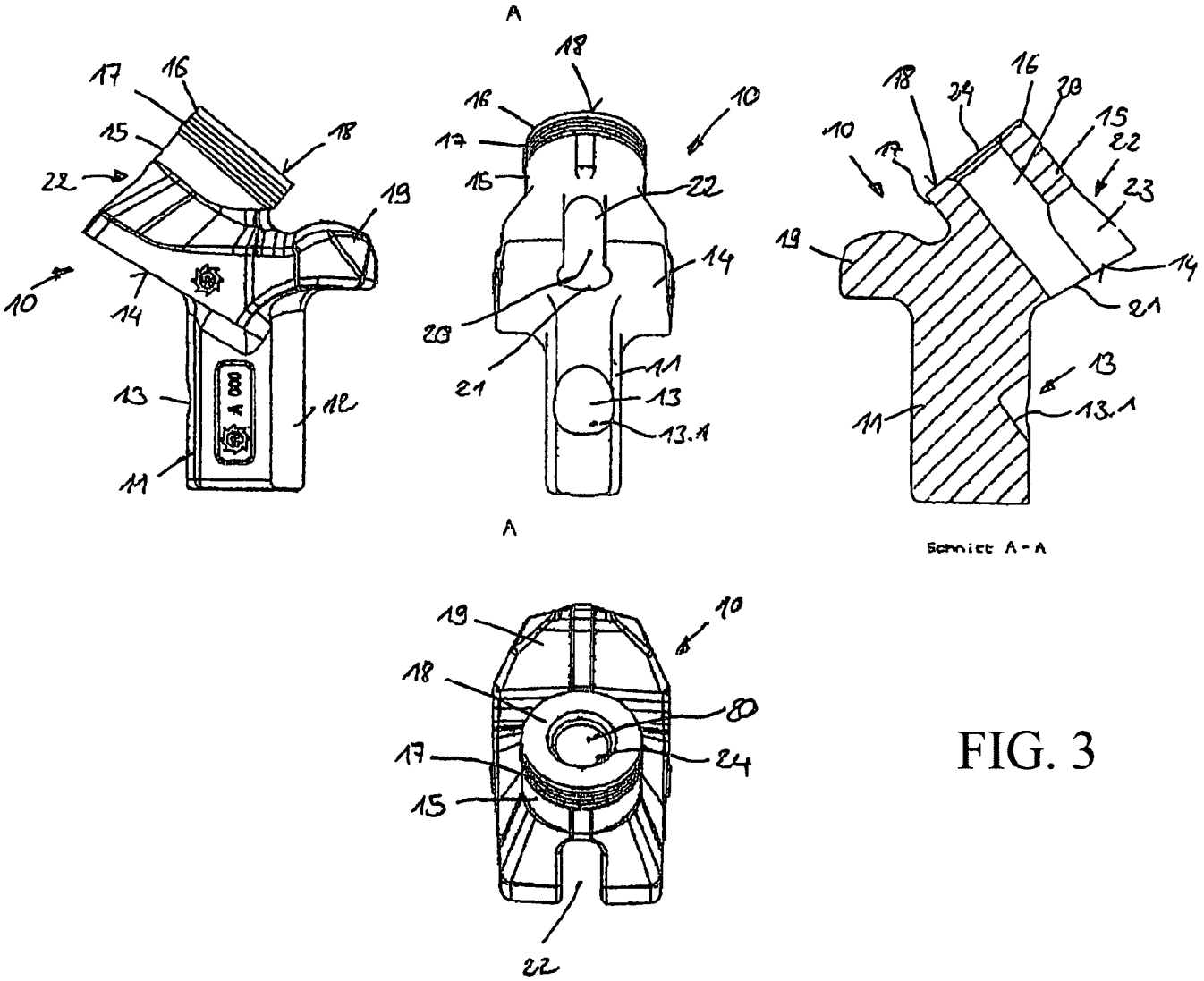
FIG. 3 shows the chisel holder of FIG. 2, each in a different plan view.

The structure of the chisel holder 10 is shown in greater detail in FIGS. 2 and 3, which show that the chisel holder 10 has a holding neck 15 adjoining the fastening neck 11 and forms a rear support face 14 which, in the mounted state, is seated on a counter-face 43 of the base element 40. The holding neck 15 has a cylindrical neck 16, into which wear markings *17*, designed as encircling depressions, are cut in the form of grooves. The cylindrical neck 16 terminates with a support surface 18. A chisel receiver 20 is cut through the support surface 18 into the chisel receiver 20. The chisel receiver 20 is embodied as a cylindrical through-bore and in the area of or near the support surface 18 forms a chisel insertion opening 24, and facing away from it an expulsion opening 21.

An opening 22 is cut into the holding neck 15 and creates a spatial connection between the surroundings and the chisel receiver 20. Here, the opening 22 opens the chisel receiver 20 in the direction toward the centrifugal force side of the chisel holder 10, as shown in FIG. 1. The chisel holder 10 has a fastening side facing the base element [10] *40*, and the centrifugal force side facing away from the base element [10] *40*.

*The opening 22 is a slit-shaped cutout having two delimitation faces 23 extending parallel with respect to each other along a longitudinal axis of the chisel receiver 20, and the delimitation faces 23 are one of at a distance from each other which is less than or equal to a bore diameter of the chisel receiver 20, and extending at an angle with respect to each other at an angle of less than 180 degree.*

When the tool is used, the milling roller, and with it the tool holder arrangement, is rotated in the direction of the arrow "A" indicated in FIG. 1.

Centrifugal forces are thus created which act, directed radially outward, in the direction of the centrifugal force side of the chisel holder 10.

As shown in FIG. 1, a chisel 30 is placed into the chisel receiver 20 of the chisel holder 10. The chisel 30 has a cylindrical chisel shaft 31, on which a chisel head 32 is formed in one piece. In a known manner, a wear protection disk 35 is pushed on the chisel shaft 31 and embodied in a circular manner and also completely covers the support surface 18 of the chisel holder 10. On the side facing away from the support surface 18, the chisel head 32 is supported and centered on the wear protection disk 35. A longitudinally-slit clamping sleeve 34 is pushed on the chisel shaft 31 and has holding elements 34.1, which engage an encircling groove of the chisel shaft 31 for forming a rotary seating. Thus the chisel 30 is maintained freely rotatable in the clamping sleeve, but axially secured against being lost.

While removing chips, removed fine material can reach the area of the chisel receiver [22] *20* and gain access to the area between the chisel head 32 and the wear protection disk 35, or between the wear protection disk 35 and the support surface 18 of the chisel holder 10. It reaches the chisel receiver [35] *20* over these paths, and in the present case the area between the chisel shaft 31 and the clamping sleeve 34. A pumping effect is created as a result of the rotary movement and of a slight limited axial play of the chisel shaft 31 in the clamping sleeve and conveys the removed material in the direction toward the free end of the chisel shaft 31. The removed material then often forms a sticky suspension if a coolant, for example water, is employed in the removal process. As a result of the pumping effect, the removed material is conveyed along the chisel axis from the chisel insertion opening in the direction of the expulsion opening, and thus against the direction of the centrifugal force, until it exits at the free end of the chisel shaft 31 from the intermediate area between the chisel shaft 31 and the clamping sleeve 34. The centrifugal forces acting on the removed material collecting move it through the opening 22 out of the chisel receiver 20.

A tool holder arrangement in accordance with this invention can have at least one liquid spray device, representatively illustrated as spray device 50, assigned to the chisel holder, which introduces liquid into the chisel receiver through the opening. Then the liquid dissolves the removed material collecting in the chisel receiver, so that it can be easily removed through the opening.

Here use is made of the fact that this area is in the "shadows" with respect to the direction of rotation of the roller, i.e. in the area of a clear surface of the chisel 30 and the chisel holder 10. Removal in the direction of rotation or laterally is not possible because of the circumstances at the milling roller, which customarily is enclosed by a hood, because the path is blocked by the milled material, or by the surface to be removed.

As FIG. 1 shows, the opening 22 extends some distance past or beyond the free end of the clamping sleeve 34, and thus also of the chisel shaft 31. Thus, the removal process can take place dependably. This would also be the case if the opening 22 terminates with the free end of the clamping sleeve 34 of the chisel shaft 31 or is arranged offset for some distance.

The opening 22 is in spatial connection with a rear cutout 44 of the base element 40.

A generous access to the free end of the chisel shaft 31 is thus created. This simplifies the application of a disassembly tool to the visible end of the chisel shaft 31. It can then be easily pushed through the removal opening 43 into the chisel receiver 20.

This invention is not limited to the described exemplary embodiment. For example, it is also possible to use a clamping sleeve 34 which does not cover the entire chisel shaft 31. Then the transport of the removed material takes place in the area between the inner wall of the chisel receiver 20 and the chisel shaft 31 which is not covered.

The invention claimed is:

1. A tool holder arrangement with a chisel holder (10) having a chisel receiver (20) in a holding neck (15) for receiving a chisel (30) which is exchangeably received within the chisel receiver (20) embodied in a shape of a bore and having a chisel insertion opening (24), wherein the chisel holder (10) has a fastening side with a fastening neck (11) and facing away from the fastening side has an exterior, and wherein during a tool operation centrifugal forces act in a direction from the fastening side to the exterior, the tool holder arrangement comprising:

the holding neck (15) having an opening (22) penetrating an interior cylindrical wall of the chisel receiver (20) and creating a spatial connection with surroundings, and the opening (22) opening the chisel receiver (20) toward the exterior;

wherein the chisel receiver (20) is a through-bore and has an expulsion opening (21) facing away from the chisel insertion opening (24), and the opening (22) opens the chisel receiver (20) near the expulsion opening (21) and extends, starting at the expulsion opening (21), in a second direction of the chisel insertion opening (24).

2. The tool holder arrangement in accordance with claim 1, wherein a chisel shaft (31) of the chisel (30) is inserted into the chisel receiver (20), and the opening (22) is arranged at least in an area of the chisel receiver (20) assigned to a shaft end.

3. The tool holder arrangement in accordance with claim 2, wherein the opening (22) is a slit-shaped cutout having two delimitation faces (23) extending parallel with respect to each other along a longitudinal axis of the chisel receiver (20), and the delimitation faces (23) are one of at a distance from each other which is less than or equal to a bore diameter of the chisel receiver (20), and extending at an angle with respect to each other at an angle of less than 180°.

4. The tool holder arrangement in accordance with claim 3 wherein the opening (22) occupies a portion of the interior wall of the chisel receiver extending over less than 180° of a circumference of the bore-shaped chisel receiver (20).

5. The tool holder arrangement in accordance with claim 4, wherein the chisel holder (10) is fastened on a base element (40), the base element (40) has a cutout (44) which provides access for a disassembly tool to the expulsion opening (21) of the chisel receiver (20), and the cutout (44) makes a transition into the opening (22).

6. The tool holder arrangement in accordance with claim 5, wherein at least one liquid spray device is assigned to the chisel holder (10) and introduces liquid into the chisel receiver (20) through the opening (22).

7. The tool holder arrangement in accordance with claim 6, wherein the liquid spray device applies a jet of liquid to a free end of the chisel shaft (31).

[8. The tool holder arrangement in accordance with claim 1, wherein a chisel shaft (31) of the chisel (30) is inserted into the chisel receiver (20), and the opening (22) is arranged at least in an area of the chisel receiver (20) assigned to a shaft end.]

9. The tool holder arrangement in accordance with claim 1, wherein the opening (22) is a slit-shaped cutout having two delimitation faces (23) extending parallel with respect to each other along a longitudinal axis of the chisel receiver (20), and the delimitation faces (23) are one of at a distance from each other which is less than or equal to a bore diameter of the chisel receiver (20), and extending at an angle with respect to each other at an angle of less than 180°.

10. The tool holder arrangement in accordance with claim 1, wherein the opening (22) occupies a portion of the interior wall of the chisel receiver extending over less than 180° of a circumference of the bore-shaped chisel receiver (20).

11. The tool holder arrangement in accordance with claim 1, wherein the chisel holder (10) is fastened on a base element (40), the base element (40) has a cutout (44) which provides access for a disassembly tool to the expulsion opening (21) of the chisel receiver (20), and the cutout (44) makes a transition into the opening (22).

12. The tool holder arrangement in accordance with claim 1, wherein at least one liquid spray device is assigned to the chisel holder (10) and introduces liquid into the chisel receiver (20) through the opening (22).

13. The tool holder arrangement in accordance with claim 12, wherein the liquid spray device applies a jet of liquid to a free end of the chisel shaft (31).

14. A tool holder arrangement, comprising:

a chisel holder having a chisel receiver in a holding neck for receiving a chisel which is exchangeably received within the chisel receiver through an insertion opening, wherein the chisel holder has a fastening side with a fastening neck and facing away from the fastening side has an exterior, and wherein during a tool operation centrifugal forces act in a direction from the fastening side to the exterior;

the chisel receiver being a cylindrical through-bore and having an expulsion opening at an end of the holding neck that faces away from the chisel insertion opening; and an opening in the holding neck, the opening penetrating an interior cylindrical wall of the chisel receiver and creating a spatial connection between the chisel receiver and the surroundings to open the chisel receiver toward the exterior, the opening intersecting with the expulsion opening and extending from the expulsion opening toward the chisel insertion opening.

15. The tool holder arrangement in accordance with claim 14, wherein the opening extends from the expulsion opening toward the chisel insertion opening a distance that places a portion of a chisel shaft of the chisel inserted into the chisel receiver beneath the opening.

*16. A tool holder arrangement with a chisel holder having a chisel receiver in a holding neck for receiving a chisel which is exchangeably received within the chisel receiver embodied in a shape of a bore and having a chisel insertion opening, wherein the chisel holder has a fastening side with a fastening neck and facing away from the fastening side has an exterior, and wherein during a tool operation centrifugal forces act in a direction from the fastening side to the exterior, the tool holder arrangement comprising:*

*the holding neck having an exterior opening penetrating an interior wall of the chisel receiver and creating a spatial connection with surroundings, and*

*the exterior opening opening the chisel receiver toward the exterior;*

*wherein at least one liquid spray device is assigned to the chisel holder and introduces liquid into the chisel receiver through the exterior opening.*

*17. The tool holder arrangement in accordance with claim 16, wherein the liquid spray device applies a jet of liquid to a free end of the chisel shaft.*

*18. A method of operating a tool holder arrangement, the method comprising:*

*(a) providing a tool holder arrangement, including:*

*a chisel holder having a chisel receiver in a holding neck, wherein the chisel holder has a fastening side with a fastening neck and facing away from the fastening side has an exterior, and wherein during a tool operation centrifugal forces act in a direction from the fastening side to the exterior;*

*the chisel receiver being a cylindrical through-bore and having an insertion opening for receiving a chisel, and an expulsion opening at an end of the chisel receiver that faces away from the chisel insertion opening;*

*a chisel received within the chisel receiver through the insertion opening, the chisel having a chisel head and a chisel shaft, the chisel shaft having a free end; and*

*an exterior opening in the holding neck, the exterior opening extending toward the chisel insertion opening at least to the free end of the chisel shaft; and*

*(b) operating the tool holder arrangement to engage a surface with the chisel and remove material from the surface.*

*19. The method of claim 18, further comprising:*

*during step (b), permitting the chisel to rotate within the chisel receiver and transporting removed material through the chisel receiver in a direction away from the chisel head.*

*20. The method of claim 19, further comprising:*

*allowing the removed material to escape from the chisel receiver by centrifugal forces moving the removed material through the exterior opening and thereby maintaining free rotatability of the chisel.*

*21. The method of claim 18, wherein:*

*in step (a), the exterior opening extends past the free end of the chisel shaft toward the chisel insertion opening.*

* * * * *